(12) United States Patent
Suare et al.

(10) Patent No.: US 8,512,505 B2
(45) Date of Patent: *Aug. 20, 2013

(54) METHODS OF FORMING ARCHITECTURAL RESIN PANELS WITH TRANSLUCENT VENEER LAYERS

(75) Inventors: Ruben Suare, Salt Lake City, UT (US); Kriby V. Rea, Salt Lake City, UT (US); Raymond L. Goodson, Sandy, UT (US); R. Talley Goodson, Salt Lake City, UT (US)

(73) Assignee: 3form, Inc., Salt Lake City, UT (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/704,003

(22) Filed: Feb. 11, 2010

(65) Prior Publication Data
US 2010/0143662 A1   Jun. 10, 2010

Related U.S. Application Data

(63) Continuation of application No. 12/405,044, filed on Mar. 16, 2009, now Pat. No. 7,691,486, which is a continuation of application No. 11/556,110, filed on Nov. 2, 2006, now Pat. No. 7,504,159.

(60) Provisional application No. 60/733,500, filed on Nov. 4, 2005.

(51) Int. Cl.
*B29C 65/02* (2006.01)
*B32B 37/04* (2006.01)
*B32B 37/18* (2006.01)

(52) U.S. Cl.
USPC ...... 156/309.6; 156/212; 156/285; 428/537.1

(58) Field of Classification Search
USPC .................. 156/212, 285, 286, 308.2, 309.6; 428/537.1
See application file for complete search history.

(56) References Cited

U.S. PATENT DOCUMENTS 3,890,185 A * 6/1975 Umazume ..................... 156/299
4,552,792 A * 11/1985 Julian et al. .................. 428/42.2

(Continued)

FOREIGN PATENT DOCUMENTS

JP           7-223206        * 8/1995
WO    WO2005061221       * 7/2005

OTHER PUBLICATIONS

Notice of Allowance, U.S. Appl. No. 11/556,110, mailed Jan. 27, 2009 (6 pages).

(Continued)

*Primary Examiner* — Katarzyna Wyrozebski Lee
*Assistant Examiner* — Scott W Dodds
(74) *Attorney, Agent, or Firm* — Workman Nydegger (57) ABSTRACT

Implementations of the present invention relate aesthetically pleasing decorative architectural resin panels having a thin or brittle veneer layer, such as thinly sliced natural wood or stone. In particular, at least one implementation includes a flat or curved decorative resin panel made with a natural wood veneer layer whose structural integrity has been maintained despite being subject to various heats and pressures. The resulting resin panel is at least partially translucent, and allows for a unique display both of the resin sheets used to form the panel and of the thin wood materials encapsulated therein. Additional implementations relate to the use of other brittle veneer layers, such as translucent stone, translucent metals, or the like, which also provide unique, decorative architectural, aesthetic features.

20 Claims, 5 Drawing Sheets

(56) References Cited

U.S. PATENT DOCUMENTS

| | | | |
|---|---|---|---|
| D333,352 S | 2/1993 | Heidmann | |
| 5,194,310 A | 3/1993 | Lenderink | |
| 5,423,933 A * | 6/1995 | Horian | 156/182 |
| D376,636 S | 12/1996 | Betz | |
| 6,322,862 B1 | 11/2001 | Sakai | |
| 6,333,094 B1 | 12/2001 | Schneider et al. | |
| D466,224 S | 11/2002 | Stackhouse | |
| 6,649,245 B2 * | 11/2003 | Lenderink | 428/121 |
| 6,743,327 B2 | 6/2004 | Schober | |
| 7,090,380 B2 | 8/2006 | Gerfers, III | |
| D537,544 S | 2/2007 | Bledsoe et al. | |
| D540,473 S | 4/2007 | Loggen | |
| D582,574 S | 12/2008 | Mackenzie | |
| 7,504,159 B1 | 3/2009 | Suare et al. | |
| D609,826 S | 2/2010 | Suare et al. | |
| 2007/0275247 A1 * | 11/2007 | Stephan et al. | 428/411.1 |

OTHER PUBLICATIONS

Office Action, U.S. Appl. No. 11/556,110, mailed Jun. 30, 2008 (4 pages).
Notice of Allowance, U.S. Appl. No. 29/339,022, mailed Dec. 23, 2009 (4 pages).
Notice of Allowance, U.S. Appl. No. 29/339,022, mailed Oct. 23, 2009 (4 pages).
USPTO Ex Parte Quayle Action, U.S. Appl. No. 29/339,022, mailed Aug. 25, 2009 (5 pages).
Office Action, U.S. Appl. No. 12/405,044, mailed Nov. 25, 2009 (4 pages).
Office Action, U.S. Appl. No. 12/405,044, mailed Jul. 23, 2009 (4 pages).

* cited by examiner

Fig. 4

METHODS OF FORMING ARCHITECTURAL RESIN PANELS WITH TRANSLUCENT VENEER LAYERS

CROSS-REFERENCE TO RELATED APPLICATIONS

The present invention is a continuation of U.S. patent application Ser. No. 12/405,044, filed on Mar. 16, 2009, entitled "Resin-Based Panels Having Translucent Veneer Layers," which is a continuation of U.S. patent application Ser. No. 11/556,110, filed on Nov. 2, 2006, entitled "Resin-Based Panels Having Thin or Brittle Veneer Layers and Methods of Making Same," now U.S. Pat. No. 7,504,159, which claims the benefit of and priority to U.S. Provisional Patent Application No. 60/733,500, filed on Nov. 4, 2005, entitled "Resin Panels Having Thin or Brittle Image Layers and Methods of Making Same," now expired. The entire contents of each of the aforementioned patent applications and patent are incorporated herein by reference.

BACKGROUND OF THE INVENTION

1. The Field of the Invention

This invention relates to systems, methods, and apparatus for producing decorative resin panels. In particular, at least some aspects of the invention relate to creating decorative resin panels employing a thin or brittle natural veneer layer.

2. The Relevant Technology

Decorative panels are increasingly popular for use in architectural design implementations, such as in walls, doors, floors, dividers, lighting diffusers, ceiling panels and the like. Decorative panels can also be formed into one or more shapes for use in sculptural works. Decorative panels made of glass or polymeric resins are particularly popular in architectural design due the structural and aesthetic properties that are possible in some circumstances. Typical polymeric resin materials used for making decorative panels include styrene based resins such as acrylonitrile butadiene styrene or "ABS", polyvinyl chloride or "PVC"; polyacrylate materials such as poly(methyl methacrylate) or "PMMA" (also known as acrylic); polyester or copolyester based materials such as poly(ethylene terephthalate), "PET," either modified or unmodified with 1 to 99 mole percent of a diol or combination of diols, such as ethylene glycol, neopentyl glycol or cyclohexanedimethanol, or "PETG" and "PCTG"; as well as polycarbonate resin based materials.

There are many different materials (and ways for manufacturing these materials) used to create a resin-based panel that can be used for decorative purposes. In one example, a first sheet, such as an eighth-inch sheet of glass or polymeric resin sheet is positioned on a surface, an image layer is then positioned on the first sheet, and a second eighth-inch sheet of glass or polymeric resin is positioned on top of the image layer, thereby creating about a quarter or half-inch assembly. The combined assembly is then solidified using any number of panel forming processes. For example, a manufacturer might apply a liquid adhesive between the first and second sheets in the case of a glass assembly, or might thermoform the first and second sheets about the layer using an appropriate amount of temperature and pressure. The resulting panel, which exhibits the aesthetic properties of the layer, is then prepared and positioned in the appropriate architectural environment (e.g., door, window, wall, etc.)

Despite this seeming interchangeability of material compositions (e.g., glass, or polymeric resin), the choice of material for the panel can have a significant impact on the panel's ultimate use. For example, one type of decorative panel may be made by positioning a thin, decorative material, such as wood veneer, between two glass sheets. The manufacturer then applies a translucent liquid adhesive or casting resin between the glass sheets, which then cures at ambient temperature to form a composite panel. The resulting decorative panel in this example has a look of the decorative material, also having many of the aesthetic features (e.g., texture, shine, translucency) typically associated with glass. Unfortunately this type of glass panel is not used as much as it could be, since, as previously mentioned, glass works tend to be much more expensive, tend to be heavier, more fragile or brittle, and tend to be difficult to manufacture into a curved formation. As such, decorative glass panels are not ordinarily offered in many of the various shapes that could be possible or desired.

By contrast, conventional products using polymeric, resin-based materials have other types of limitations, such that laminates of thin and/or brittle natural materials can be difficult or impossible to make, particularly with any useful efficiency. For example, polymeric resin-based panels are generally formed about a decorative layer using combinations of fairly high temperature and pressures (e.g., about 300° F., and about 100 psi, etc.) Such temperatures and pressures are generally needed to soften the resin sheets to fuse the natural decorative layer to the opposing resin-based substrate panels. Nevertheless, these conventional thermoforming temperatures and pressures can be particularly harsh and can cause thin and/or brittle natural materials to split or otherwise deform, resulting in a laminate that does not have the desired aesthetic effect.

As such, conventional mechanisms for creating a natural-appearing image layer between polymeric resin panels generally involve substituting a decorative artificial image layer in place of the decorative natural material. For example, one conventional mechanism involves creating a printed film of a natural material, such as printing a natural material's image on a relatively thin polymeric resin sheet. In such a case, the printed image might be that of simulated wood or granite.

A manufacturer might then laminate the printed film or sheet by thermoforming two or more resin-based sheets about the printed film layer. Decorative panels made using this process can thus simulate the look of a laminated natural material to some degree without encountering some of the aforementioned manufacturing difficulties associated with using true, natural materials. One will appreciate, nevertheless, that even the best of such processes (printing, thermoforming, or otherwise) will betray the artifice of the image layer. That is, it is difficult if not impossible for most printing techniques to accurately convey each expected aesthetic of a true natural material.

Conventional mechanisms are therefore inefficient, if not completely ineffective, at accurately creating decorative resin-based panels that convey the aesthetics of true, natural materials. The look of true, natural materials, however, is increasingly popular in a number of architectural design and building applications. As such, there is an increasing need to combine the benefits of resin-based materials with the look of true, natural materials in an efficient, cost-effective way.

BRIEF SUMMARY OF THE INVENTION

Implementations of the present invention solve one or more of the foregoing problems in the prior art with systems, methods, and apparatus for manufacturing aesthetically pleasing, decorative architectural post-formable resin-based panels having a thin or brittle natural material layer(s) (or "veneer layer," or "natural veneer layer.") In particular, at least one implementation of the present invention includes a flat or curved decorative resin-based panel made with a translucent, natural wood veneer layer that has been maintained in desired form throughout the panel forming process. Additional or alternate implementations can include panels made using a natural translucent stone material as the veneer layer.

For example, a decorative resin-based panel in accordance with an implementation of the present invention includes a substantially translucent first resin layer that has been formed into a shape, and includes a substantially translucent second resin layer that has been formed to correspond with the shape of the first resin layer. The decorative resin panel further includes an at least partially translucent natural veneer layer positioned between the first and second resin layers in a manner that the natural veneer layer takes the shape of the first and second resin layers. When formed using an appropriate thermoforming method and apparatus, the combination of the first resin layer, the second resin layer, and the natural veneer layer are at least partially translucent.

In addition, a method in accordance with an implementation of the present invention for forming the decorative resin panel involves creating a laminate assembly. The laminate assembly can be created by positioning a substantially translucent first resin layer on a surface, positioning an at least partially translucent natural veneer layer about an inner surface of the first resin layer, as well as positioning a substantially translucent second resin layer about the natural veneer layer. The laminate assembly is then placed in a forming oven, press or autoclave, where the temperature of the laminate assembly is raised to an appropriate level that causes the first and second resin layers to adhere to the natural veneer layer. The resulting combination is at least partially translucent.

Additional features and advantages will be set forth in the description that follows, and in part will be obvious from the description, or may be learned by the practice of the invention. The features and advantages may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Implementations of the present invention relate to systems, methods, and apparatus for manufacturing aesthetically pleasing, decorative architectural post-formable resin-based panels having a thin or brittle natural material layer(s) (or "veneer layer," or "natural veneer layer.") In particular, at least one implementation of the present invention includes a flat or curved decorative resin-based panel made with a translucent, natural wood veneer layer that has been maintained in desired form throughout the panel forming process. Additional or alternate implementations can include panels made using a natural translucent stone material as the veneer layer.

As will be appreciated more fully from the present description and claims, decorative resin-based panels made in accordance with the principles described herein to incorporate true, natural materials can be made at least partially translucent, and can be made to conform to any number of shapes. For example, implementations of the present invention include relatively thin natural veneer layers comprising, for example, thinly sliced wood or stone sheets. The relative thinness of the veneer layer, combined with the optical properties of the resin layers, allows the resulting resin panel to project a highly desired translucence aesthetic.

Furthermore, where veneer layer components are also flexible, such as due to their relative thinness, or due to an inherent property of the material itself, the resultant resin panel can also be shaped into any number of aesthetically pleasing shapes, including a variety of curved shapes, without causing the natural veneer layer to split or otherwise deform, such as might be the natural tendency. Accordingly, the resin panels in accordance with implementations of the present invention may be used in walls, ceilings, or floor structures where aesthetically pleasing or even functional (e.g., acoustic) shapes and views of true, natural materials are desired.

Figure 1A:
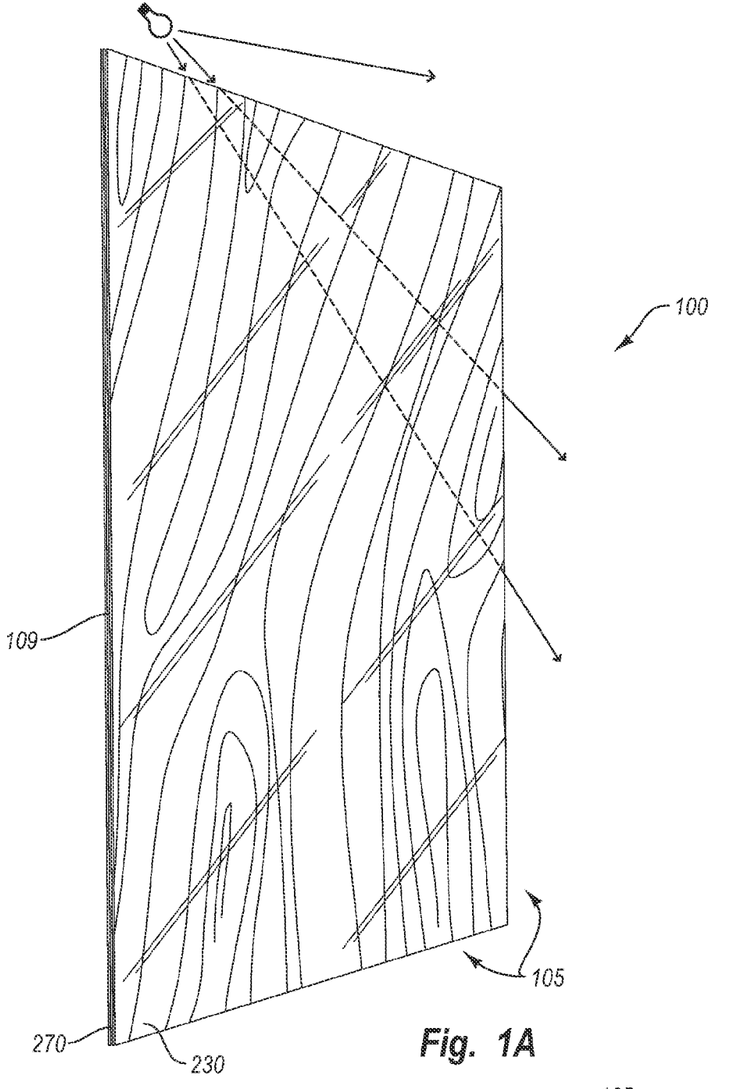
FIG. 1A illustrates an overview of a resin panel made with a natural translucent wood veneer layer in accordance with an implementation of the present invention.

For example, FIG. 1A illustrates at least one implementation of a decorative resin-based panel incorporating a natural veneer layer that can be made in accordance with aspects of the present invention. In particular, FIG. 1A illustrates a perspective view of a decorative resin panel 100, in which a thin or brittle natural veneer layer 109, in this case a natural wood sheet showing a thin wood grain, is embedded between two resin sheets 230, 270 (and/or 290, FIG. 2). In one implementation, the layer 109 and resin layers are symmetrical, such that the resin panel 100 has two opposing viewable surfaces 105. In such a case, layer 109 can be viewed from either side of the final decorative resin panel product 100.

Figure 1B:
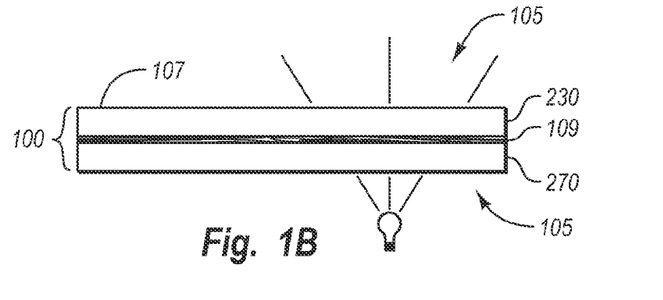
FIG. 1B illustrates a cross-sectional view of the product shown in FIG. 1A.

FIG. 1A also shows that light can be transmitted from one side of panel 100 to another. In particular, the materials used to create panel 100 can be modified in any number of ways to adjust the amount of light that passes through. For example, FIG. 1B shows that the natural veneer layer 109 is sufficiently thin compared with the resin sheets 230, 270, which are also at least partially translucent. As a result, at least some light can pass through the first resin sheet 270, the thin natural veneer layer 109, and the second resin sheet 230 in combination, creating a desired aesthetic translucence property. The following summarizes thickness for a laminate resin-based panel that encapsulates a natural veneer layer compared with total light transmission.

| Thickness (in.) | Total Light Transmission |
| --- | --- |
| 3/32≈ | 3.32% |
| 1/2≈ | 1.60% |
| 31/32≈ | 0.84% |

A manufacturer may, however, block this light transmittance to some extent by using a thicker sheet of natural wood veneer in layer 109, or may accommodate greater light transmittance with thinner sheets of wood veneer in layer 109. In addition, a manufacturer may also choose other materials, rather than necessarily sheets of natural wood, such as thin sheets of naturally-occurring stone, rock, or crystal. In any event, the manufacturer can use any thickness for desired translucency relative to an inherent light transmitting property in the material itself.

As shown, therefore, the thickness of the materials used in creating resin-based panel 100 (or 110, FIG. 1C) are sufficient to produce a resulting panel thickness of anywhere from one-eighth inch to five inches. For example, in one implementation, a manufacturer uses two one-inch resin sheets 230, 270 and encapsulates a thirty-second (1/32) of an inch decorative, natural veneer layer 109, to thus create an approximately 2-inch panel.

Figure 1C:
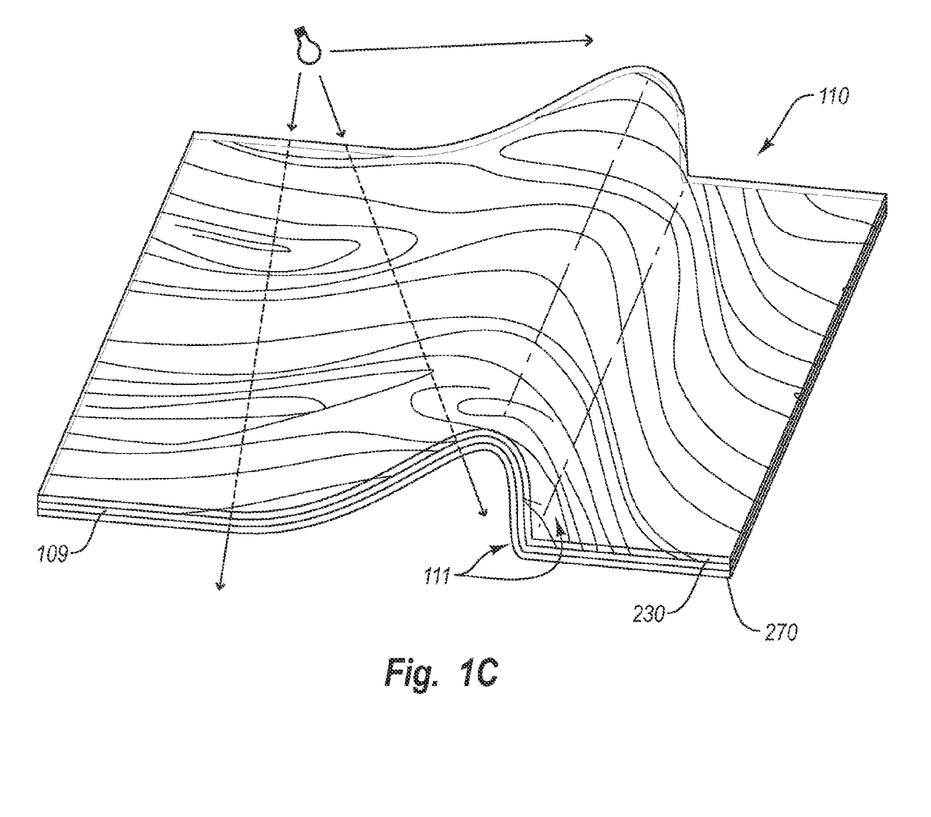
FIG. 1C illustrates a perspective view of a curved resin panel having a natural wood veneer layer in accordance with an implementation of the present invention.

In addition to light transmittance, and as previously mentioned, one will appreciate that relatively thin sheets of decorative natural veneer materials can also be chosen for malleability or bend-ability. For example, FIG. 1C illustrates a decorative resin panel 110 that can be formed into a bent or curved conformation in accordance with one or more implementations of the present invention. In particular, FIG. 1C shows that resin panel 110 has a veneer layer 109, which exhibits a natural wood grain bent about a desired shape. As with FIG. 1A, FIG. 1C also has one or more viewable surfaces, in this case opposing surface(s) 111, which correspond to the resin sheets 230, 270 (and/or 290, FIG. 2) used to create panel 110. As a result, natural veneer layer 109 can also be viewed in panel 110 from either side of the curved portion, similar with panel 100, thus increasing the aesthetic feel of the resin panel 110, as well as the flexibility in positioning panel 110 in a desired area or orientation in a ceiling, wall, or floor.

Figure 2:
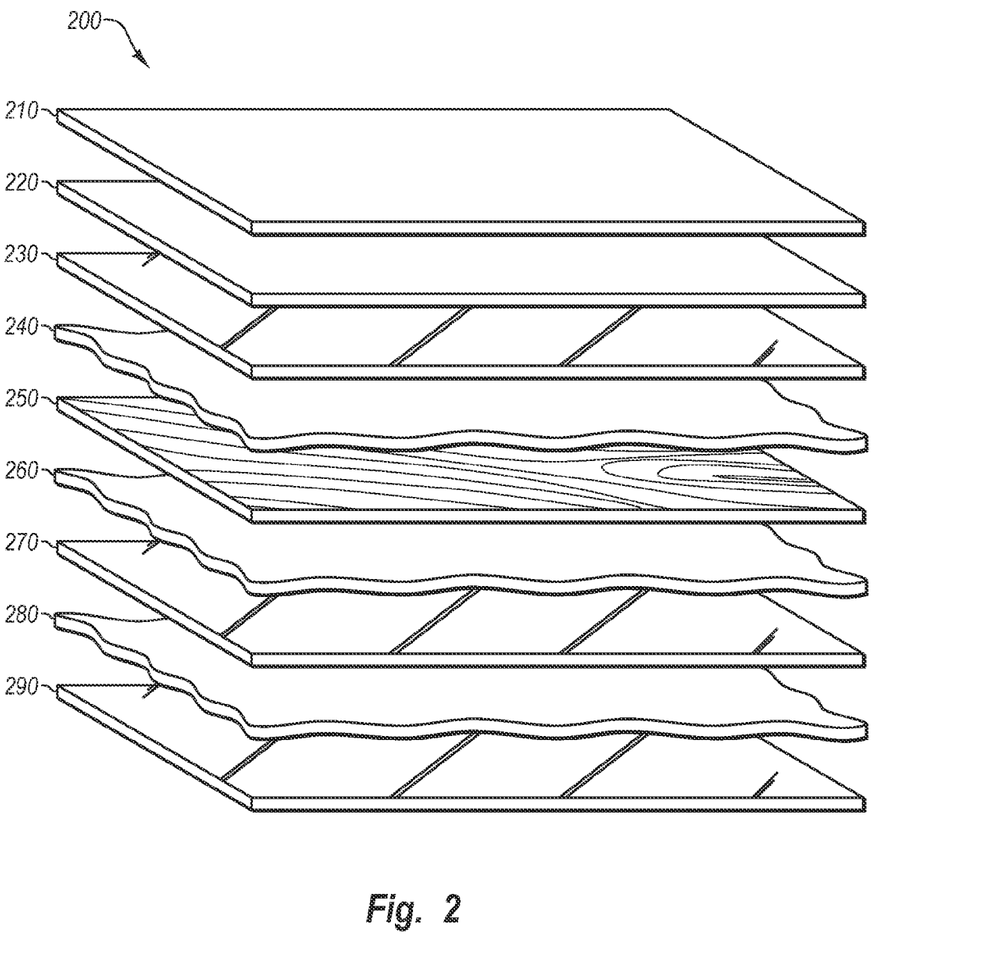
FIG. 2 illustrates an exploded perspective view of components used in preparing a laminate sheet assembly in accordance with an implementation of the present invention.

FIG. 2 illustrates an exploded view of a laminate sheet assembly 200 for use as a precursor in creating a decorative resin-based panel 100, 110, which encapsulates natural materials in accordance with an exemplary implementation of the present invention. In particular, FIG. 2 illustrates a sequential overview for positioning components of the laminate sheet assembly 200 prior to subjecting the components to a thermoforming process. For example, FIG. 2 shows that a laminate sheet assembly 200 in accordance with an implementation of the present invention includes a bottom resin layer 290. Bottom translucent resin layer 290 (as well as 230, 270) can be any translucent or transparent resin material, such as, but not limited to, at least partially translucent ABS, PVC, PMMA, PETG, polycarbonate, or the like. The bottom translucent resin layer 290 can also be any appropriate thickness for the resulting thickness of the final panel (100, 110), such as about one-half (1/2), about one quarter (1/4), about one-eighth (1/8), about one-sixteenth (1/16), or about one-thirty-second (1/32) of an inch in thickness as desired. In one exemplary implementation, bottom translucent resin layer 290 is one-half inch in thickness.

FIG. 2 further shows that laminate sheet assembly 200 can also have an adhesive layer 280 placed on top of bottom resin layer 290 in at least some implementations. Adhesive layer 280, as well as adhesive layers 260 and 240, can be any appropriate adhesive layer such as a solid film-format ethylene vinyl acetate or "EVA"; ethylene acrylates, such as ethyl methacrylate or "EMA"; polyvinyl butyral or "PVB"; or any thermoplastic polyurethane (TPU) of aliphatic or aromatic construct capable of adhering opposing resin sheets together with applied heat.

One advantage provided by an adhesive layer 280, such as those aforementioned, is that bonding can be effectuated more easily in some cases between the resin and decorative, natural veneer layers at lower temperatures and pressures than typically used without adhesive layers. Furthermore, an adhesive layer 280, such as EVA, can aid in removing air bubbles efficiently compared with using liquid-based adhesives. Nevertheless, one will appreciate that liquid adhesives may also be appropriate for adhesive layer 280 in some cases. Furthermore, it is not necessary in all cases to apply adhesive layer 280 (or 240, 260).

In any event, an at least partially translucent resin layer 270 is then positioned over adhesive layer 280. As with layer 290, resin layer 270 can be any thickness and translucence as appropriate for the thickness and optical effects of the resulting resin panel 100, 110. For example, in an exemplary implementation, translucent resin layer 270 is one-half inch in thickness, although in other implementations, the resin layer 270 can be anywhere from about one-eighth to about three-quarters of an inch in thickness. FIG. 2 further shows that laminate sheet assembly 200 also has a thin adhesive layer 260 placed on top of resin layer 270. Thereafter, a thin or brittle natural veneer layer 250 (e.g., 109) is positioned on top of adhesive layer 260.

Generally, natural veneer layer 250 will be a relatively thin layer of brittle natural material, such as an about one-thirty-second (1/32) of an inch sheet of solid wood or stone (which would otherwise deform, crack or split when exposed to conventional forming temperatures and pressures). Nevertheless, the thickness of this material can also vary from about one-half, one-quarter, one-eighth, or about one-sixteenth of an inch, as desired for the resulting or desired aesthetic. As previously described, the thickness of the veneer layer material will typically be such that, for the given material, the veneer layer is at least partially translucent. Thus, for example, an eighth-inch (or less) of natural wood or textile veneer may be at least partially translucent, while a thirty-second inch or less in thickness of a stone veneer may be at least partially translucent.

If the relative thinness of the material makes the natural veneer layer (e.g., thin stone layer) too brittle, the manufacturer can further stabilize the material by first laminating the natural veneer material to create an impregnated, thin, resin-encapsulated natural veneer layer. For example, with respect to stone, a manufacturer can cut the stone to as thin as one-thirty-second of an inch or less using any number of conventional processes. The manufacturer may then separately laminate the stone layer prior to positioning the stone layer in the laminate assembly (i.e., as layer 250). The manufacturer may then use the laminated stone veneer layer in the forming process as described above between two resin-sheets. Thus, a number of processes can be used to ensure the material for natural veneer layer 250 has the appropriate thickness for translucence, as well as stability to withstand the thermoforming processes described herein.

FIG. 2 also shows that the laminate sheet assembly 200 then has a thin adhesive layer 240 placed on top of natural veneer layer 250; and, a translucent resin layer 230 of the appropriate thickness is then placed on top of thin adhesive layer 240. For example, in an exemplary implementation, translucent resin layer 230 is about one thirty-second of an inch in thickness in order to ensure that the natural veneer layer 250 is as close to at least one viewable surface in the final product (i.e., 100, 110) as possible.

In some implementations, as also shown in FIG. 2, a texture paper layer 220 (e.g., acrylic paper) is also then placed against the translucent resin layer 230. Preferably, the paper layer 220 comprises a textured adhesive surface (e.g., acrylic adhesive, not shown) on at least one side, such that the adhesive surface would adhere in this case to the resin layer 230, and such that the texturing of the paper will impart a corresponding texture to the resin layer 230 surface. The paper layer 220 will removably-adhere to the final decorative product during the thermoforming process, and be peeled away from the decorative laminate panel when the decorative laminate panel is ultimately put to use, thereby revealing the imparted texture.

FIG. 2 further shows that laminate assembly 200 can include a soft, albeit heavy duty, next layer, which is generally a pressure pad 210 positioned on top of the paper layer 220. The pressure pad 210 can be useful to help equalize the pressure on, and temperature of, the remaining layers, thereby helping form a highly uniform surface of the decorative laminate panel in final form. In one implementation, the pressure pad 210 comprises a compressible fabric prepared from copper, silicone, or NOMEX, or a combination of the preceding.

One will appreciate that laminate assembly 200 can also include other layers not necessarily shown in FIG. 2, such as additional resin layers, adhesive layers, or other texture layers, and/or additional matting layers as appropriate. Such additional layers can be provided as part of the laminate assembly 200, or can be provided to the resulting laminate panel after the thermoforming processes described herein. In any event, upon creation of the laminate assembly 200, the manufacturer subjects the various materials to a thermoforming process.

Figure 3:
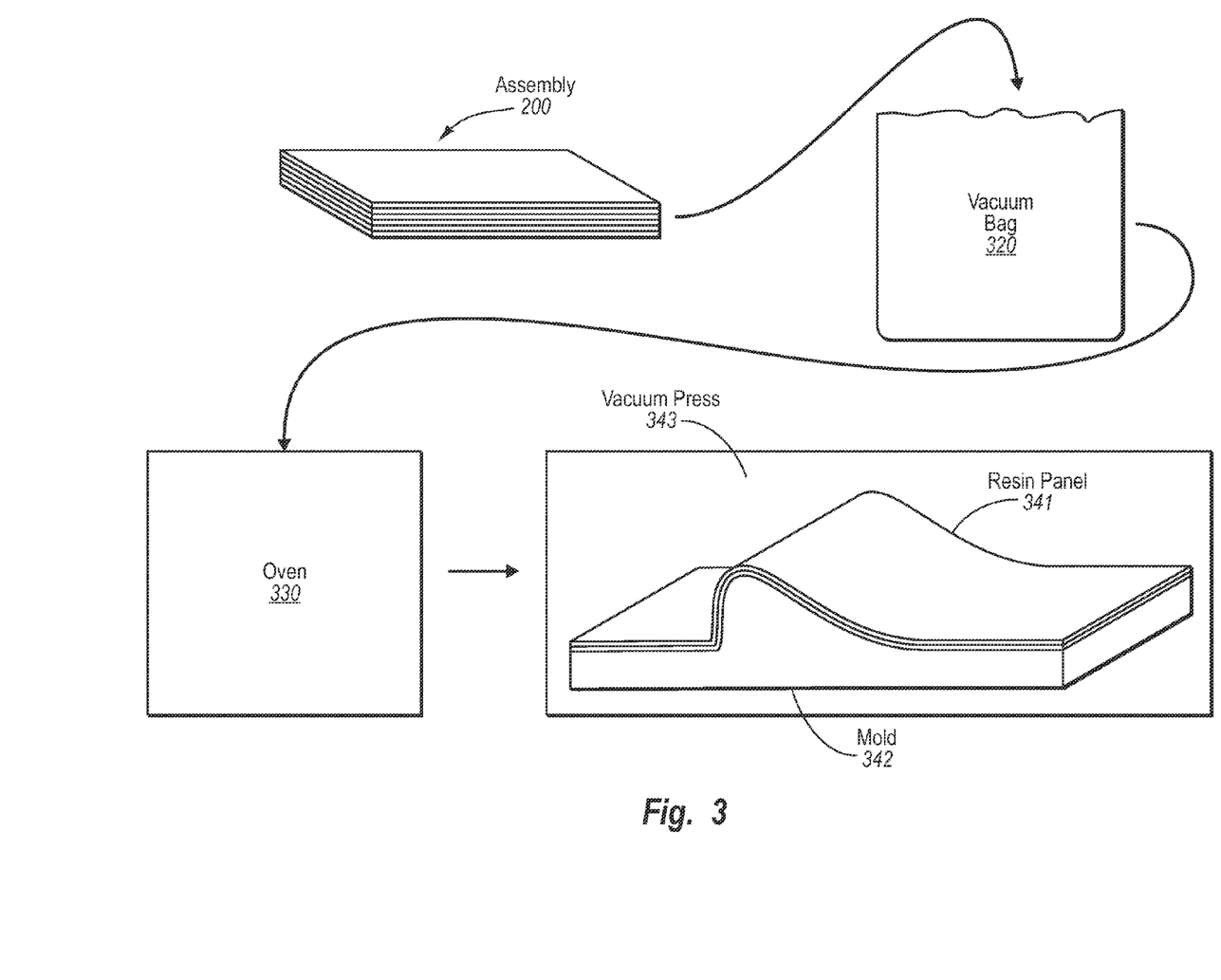
FIG. 3 illustrates an overview schematic diagram for producing a decorative resin panel in accordance with the principles of the present invention.

For example, FIG. 3 illustrates an overview schematic diagram for producing a decorative resin-based panel incorporating a natural veneer layer in accordance at least one implementation of the present invention. As shown, a manufacturer places at least laminate assembly 200 (or multiple laminate assemblies—not shown) in a vacuum bag 320. The manufacturer then secures vacuum bag 320, such as with an appropriate sealer or tie, and removes air from within the vacuum bag. Removing the air from vacuum bag 320 reduces the space within the vacuum bag, and increases the pressure to about −10 to about −20 pounds per square inch ("psi"), or about 27-29 inches of mercury.

Upon increasing vacuum pressure, FIG. 3 shows that the vacuum bag 320 is then placed into an oven 330. Oven 330 can be any conventional thermoforming oven or autoclave with the ability to raise the temperature of the laminate assembly 200 to a sufficient level to cause the first and second resin layers to adhere to the natural veneer layer. For example, in at least one implementation, the oven is raised to a temperature of about 180° F. without necessarily raising the internal pressure significantly, which causes at least the first resin layer 290, the second layer 270, and/or the third resin layer 230 to soften and adhere (i.e., "laminate") to each other and/or to the natural veneer layer 250.

Although some pressure may naturally increase inside oven 330 with the rise in temperature, no additional pressure need necessarily be applied for the lamination effect to occur in this case. Upon cooling, either by forced air or standing in ambient air, an at least partially translucent decorative resin-based panel 341 is at least partially post-formable, and can be removed from the oven 330 and vacuum bag 320. The decorative resin-based panel 342 can then be finished into one or more shapes before being placed into position.

Alternatively, if the manufacturer desires to further subject the laminated, pliable resin-based panel 341 to some form of curvature, the manufacturer may further heat the oven 330 to a temperature of about 230° F. to make the resin panel even more pliable. The even more pliable resin panel 341 is then positioned about a mold, such as a mold or shaping apparatus 342. That is, the manufacturer can simply remove the heated resin panel 341 from the vacuum bag 320, and rest the resin panel 341 on top of a shaping apparatus 342. As a result, the resin panel 341 will conform to the contours of the shaping apparatus 342, due at least in part to the natural weight of the resin panel 341 component materials, as well as the pliability imparted by the oven 330 heat.

Of course, there can be any number of ways in which the manufacturer may desire to impart a specific shape to the pliable resin-based panel 341. For example the manufacturer can press the pliable resin-based panel 341 upward against a mold, or the manufacturer may simply bend the pliable resin-based panel 341 into any one or more shapes. In any event, where curvature is desired, and the pliable resin-based panel 341 has been subjected to shape formations, FIG. 3 shows that the pliable resin-based panel 341 is placed in a vacuum press 343. Vacuum press 343 removes pressure from the interior space, and further solidifies the pliable resin-based panel 341 incorporating a decorative natural veneer into final product form (100, 110) with additional heat.

Accordingly, FIGS. 1 through 3 illustrate a number of schematics for creating a post-formable resin-based panel, which encapsulates a thin natural veneer object, such that the panel is still pliable and formable to one or more desired shapes after an applied laminating process. Furthermore, FIGS. 1 through 3 illustrate schematics for creating decorative, translucent resin-based panels, which incorporate thin and/or brittle sheets of natural materials.

Figure 4:
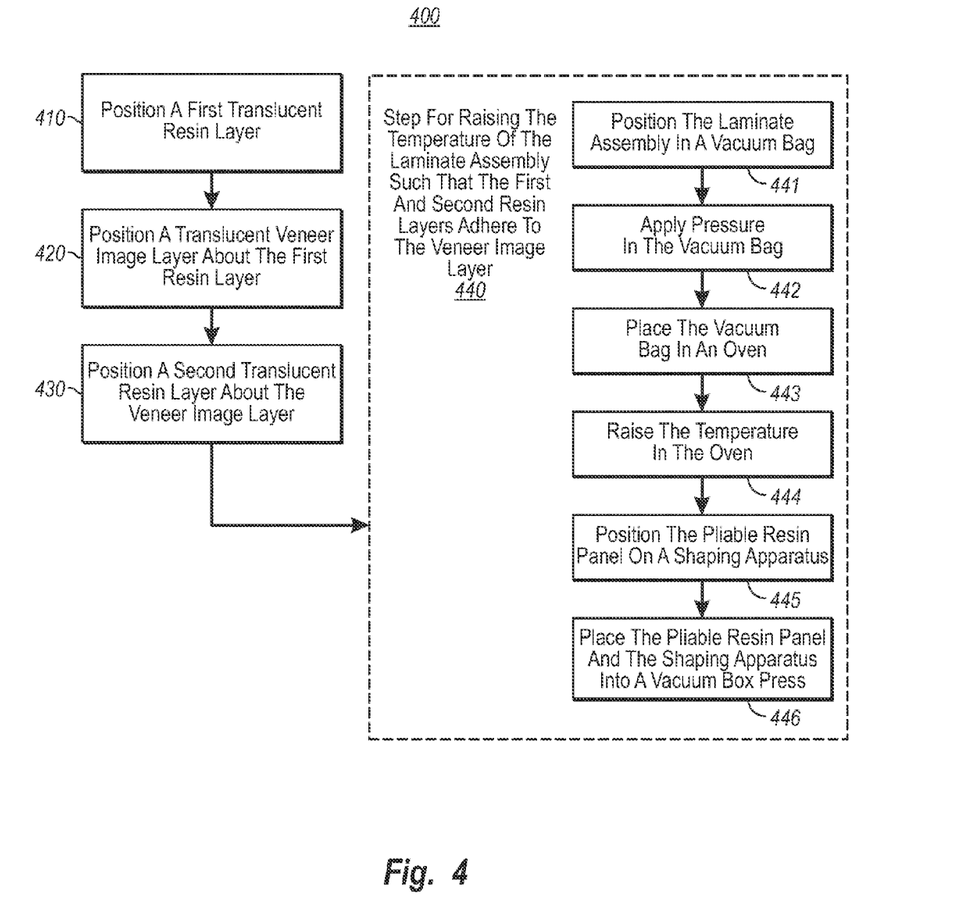
FIG. 4 illustrates a flowchart of an exemplary method for producing a decorative resin panel having a translucent natural veneer layer in accordance with an implementation of the present invention.

Implementations of the present invention can also be described in terms of functional steps in a method, and acts for accomplishing those functional steps, for manufacturing a resin panel (e.g., 100, 110). In particular, FIG. 4 illustrates a flowchart of one exemplary method 400 for producing a decorative resin panel having a natural, translucent thin or brittle natural veneer layer in accordance with the principles of the present invention. The method 400 is described below with frequent reference to FIGS. 1 through 3.

For example, FIG. 4 shows that the method 400 of creating a translucent resin panel having a unitary sheet of a thin or brittle natural veneer layer comprises an act 410 of positioning a substantially translucent first resin layer. Act 410 includes an act of positioning one or more substantially translucent first resin layers on a surface. For example, a manufacturer positions a first resin layer 290 on a surface such as a manufacturing table, and may also position another resin layer 270 about resin layer 290. The first one or more resin layers form a base upon which adhesive layers, additional resin layers, and a natural veneer layer are positioned.

In addition, FIG. 4 shows that the method 400 also comprises an act 420 of positioning an at least partially translucent natural veneer layer about the first resin layer. Act 420 includes positioning an at least partially translucent natural veneer layer about the one or more substantially translucent first resin layers. For example, the manufacturer places a natural wood or stone veneer layer 250 (e.g., 109) on top of the one or more first resin layers. In one implementation, the natural wood or stone veneer layer is thin enough to be at least partially translucent, such as from about ⅛ to about 1/32 inches.

FIG. 4 further shows that the method comprises an act 430 of positioning a second resin layer about the natural veneer layer. Act 430 includes positioning one or more substantially translucent second resin layers about the at least partially translucent natural veneer layer, such that at least the one or more first resin layers, the one or more second resin layers, and the at least partially translucent natural veneer layer form a laminate assembly. For example, the manufacturer positions the second resin layer on top of the natural wood or stone veneer layer. The second resin layer can correspond to translucent resin layer 230, although this is not required. The translucent resin layer 230 is positioned about the natural veneer layer 250 on top of adhesive layer 240. The natural veneer layer will thus be positioned between the first and second translucent resin layers and the combination of the three, along with other layer as described in relation to FIG. 2, will form a laminate assembly such as laminate assembly 200.

Furthermore, FIG. 4 shows that method 400 comprises a step 440 for raising the temperature of the laminate assembly, such that the first resin layer, the second resin layers, and the natural veneer layer form a substantially translucent decorative resin panel that conveys the aesthetic properties of the natural veneer layer. In particular, step 440 includes combining the laminate assembly such that the one or more first and one or more second resin layers adhere to the natural veneer layer in a manner that preserves the integrity of the natural veneer layer material, and such that the resulting combination is at least partially translucent.

For example laminate assembly 200 is subjected to one or more pressures and temperatures that cause the various components to fuse together into a resultant decorative translucent panel. This is done without harming the natural veneer layer materials and/or causing a material defect (i.e., causing splitting or cracking) to the natural veneer materials encapsulated inside. That is, the thinly sliced natural wood or stone is ultimately heated, and/or bent into a final form in a decorative panel without cracking, chipping, or splitting.

Although step 440 can comprise any number or order of corresponding acts for accomplishing the desired result, FIG. 4 shows that step 440 comprises at least an act 441 of positioning the laminate assembly in a vacuum bag. For example, the manufacturer positions laminate assembly 200 into vacuum bag 320 after assembling each of the assembly components together with adhesives, texture papers, NOMEX pad(s), etc. The manufacturer then seals the vacuum bag with an appropriate seal or tie.

FIG. 4 further shows that step 440 comprises an act 442 of evacuating air from the vacuum bag. For example, the manufacturer can increase the vacuum pressure inside vacuum bag 320 from about −10 to about −20 psi by further removing air from the bag. FIG. 4 also shows that step 440 comprises an act 443 of placing the vacuum bag in an oven. For example, the manufacturer can place vacuum bag 320, which contains laminate assembly 200, into oven 330. As previously mentioned, oven 330 need not necessarily be configured to alter pressure, but should at least be configured for raising an internal temperature, and thus the temperature of the laminate assembly 200 inside vacuum bag 320.

In addition, FIG. 4 shows that step 440 also comprises an act 444 of raising the temperature in an oven. Act 444 includes raising the temperature of the laminate assembly in an oven or autoclave, such that the laminate assembly becomes a substantially pliable resin panel. For example, the manufacturer can raise the temperature of oven 330 to 180° F., thereby causing the resin panels (e.g., 290, 270, 230) of laminate assembly 200 to adhere in combination with the adhesive layers (e.g., 280, 260, 240) to each other and to the wood or stone veneer layer (e.g., 250). In implementations in which a flat decorative panel is desired, the manufacturer may simply remove and cool the now-fused laminate assembly (i.e., resin-based panel 341). In implementations where a curved resin panel is desired, however, the manufacturer may subject the pliable resin panel 341 to still greater temperatures to promote thermoforming of the panel.

Accordingly, FIG. 4 also shows that step 440 can further include an act 445 of positioning the pliable resin panel on a mold or shaping apparatus. For example, the manufacturer might raise the temperature in oven 330 to between about 220° and 240° F. to make the resin panel even more pliable. The manufacturer then rests the pliable resin panel 341 on a mold, such as shaping apparatus 342, such that the pliable resin panel 341 conforms to the mold's contours. Thereafter, the manufacturer places the resin panel 341 and shaping apparatus 342 assembly into a vacuum table or vacuum press 343.

In particular, FIG. 4 shows that step 440 can also comprise an act 446 of positioning the pliable resin panel on a shaping apparatus. Act 446 includes placing the shaping apparatus and the pliable combination on a vacuum table or vacuum press, and applying pressure inside the vacuum press, such that the pliable resin panel solidifies in the shape of the shaping apparatus. For example, the manufacturer takes the pliable resin panel 341 and the mold 342, places both in vacuum press box 343, and applies pressure. This causes the pliable resin panel 341 to solidify into a final, translucent decorative resin panel 110 having the aesthetic properties at least of the thin or brittle natural veneer layer.

Although not shown, a manufacturer can also perform a step of coating (e.g., with 3FORM PATINA 2K specialty coating) to any or all surfaces of the laminate panel (e.g., after laminating and thermoforming processes when the panel is in final product form). In one implementation, the spray coating comprises an aliphatic acrylic urethane coating containing silica powder, which provides the laminate panel with added protection against physical, light-based, and chemical damage. For example, the reported pencil hardness of the spray coating is 2H. In addition, a Taber CS-17 Wheel with 1 kg loading measures only 54.8 mg of weight loss after 1000 cycles. Spray-coating also allows the laminate panel surface to be more easily re-finished in the event of any such marring/damage.

In addition, the diffuse nature of the surface coating can provide additional light scattering to spread light, and can provide the added benefit of hiding surface imperfections that may result from manufacture, installation or use. The spray coating can also provide ultraviolet screening when combined with ultraviolet absorbing compounds. For example, after SUNSHINE CARBON ARC ultraviolet testing, the coating exhibits less than 10% change in aesthetic gloss. In particular, at least one implementation of an initial gloss at 60° equates to 90+% of aesthetic gloss. After 1,000 hours of SUNSHINE CARBON ARC exposure, the final gloss at 60° will only have dropped to about 83% to about 85%.

The spray coating can also be produced with low levels of Volatile Organic Compounds (VOC), which helps to minimize environmental impacts of material use. In one implementation, for example, the VOC contents (e.g., in the 3FORM PATINA 2K) of the coating are <525 g/L.

Accordingly, the schematics and methods described herein provide a number of unique products, as well as ways for creating aesthetically pleasing, decorative, architecturally-suitable resin-based panels using very thin pieces of naturally or synthetically-occurring unitary-sheet veneer layers. As discussed herein, these resin panels are substantially translucent, and preserve the integrity of the veneer layer material that would otherwise be ruined or disfigured using conventional thermoforming processes. In particular, the manufacturing methods and apparatus described herein allow for the incorporation of thin, natural veneer layer materials, such as thin sheets of wood or stone, which have highly-desirable aesthetic properties, but at the same time have heretofore been impractical or impossible to incorporate into translucent resin panels. Furthermore, these unique products have a high degree of post-formability and reparability (scratch and/or chemical resistance) than products made using prior art devices and methods.

In addition, various implementations of the present invention are well suited to a wide variety of building environments that require certain toxicity and/or flammability specifications. With particular respect to toxicity data, for example, panels in accordance with implementations of the present invention were subjected to the UPITT Test for Combustion Product Toxicity. This test was conducted to evaluate acute lethal effects and eye damage resulting from exposure to thermal decomposition products from one or more panels made in accordance with the present invention. The test results are summarized (Table 1) and detailed (Table 2) as follows.

TABLE 1

Summarized Test Results

| | |
|---|---|
| LC50 (grams):[b] = | 19.5 |
| LA50 (mm$^2$):[c] = | 3,607 |
| Sample Thickness:[d] = | 4.93 mm |

To perform this test, a tester conditioned various sample weights of material at approximately 50% relative humidity for at least 48 hours before use. In each case, the tested sample was more than 1 mm thick. The tester then weighed the sample(s) immediately before placing them in a furnace on a weight sensor. Thereafter, the tester incrementally heated the test sample(s) at a rate of 20° C. per minute for 30 minutes, during which time the test animals, positioned for head only exposure, breathed the atmosphere generated. After a 10 minute post-exposure observation period, the animals were examined for survival and eye damage.

The tester then constructed a concentration response curve for the various material sample weights, wherein the response curve plots sample size versus percent mortality. The tester then identified the sample weight that caused death of 50% of the test animals, further quantifying the data by weight (i.e., "$LC^{50}$," or "LC50") and surface area (i.e., "$LA^{50}$," or "LA50"). The tester also measured $LC^{50}$ data for sample weight loss, furnace and exposure chamber temperatures. The tester further measured $LC^{50}$ data for carbon monoxide, carbon dioxide, and oxygen in the exposure chamber atmosphere. The results of these tests are detailed below.

TABLE 2

DATA TABLE FOR PRODUCT

| | |
|---|---|
| LC50[a] (Mass) = | 19.5 grams |
| 95% confidence interval[a] = | 15.8-24.1 grams |
| LA50 (Surface Area) = | 3,607 mm$^2$ |
| Product thickness = | 4.93 mm |

TABLE 2-continued

DATA TABLE FOR PRODUCT

| | |
|---|---|
| Furnace temperature at 1% weight loss = | 186° C. |
| Temperature range at most rapid weight loss[b] = | N/A° C. |
| Furnace temperature at apparent spontaneous flame (mean of 6 samples) = | 459° C. |
| Maximal CO in exposure chamber[b] = | 0.42%, 4200 PPM |
| Furnace temperature at maximal CO[b] = | 408° C. |
| Minimal O2 in exposure chamber[b] = | 17.20% |
| Furnace temperature at minimal O2[b] = | 459° C. |
| Number of times exposure chamber exceeded 45° C.[b] = | 1 |
| Duration exposure chamber exceeded 45° C.[b] = | 600 sec |
| Eye damage (severity)[c] = | NONE (1) |
| Number of test runs on sample material = | 6 |
| Date Testing Completed = | Jan. 31, 2005 |

[a]Calculated according to the method of C. Wall, 1952
[b]From single experiment using 19.5 gram test sample
[c]From single experiment with animals using 19.5 gram test sample; sample weight equal or closest to the LC50 value.

The tester then compared this data with similar data known for wood based on surface value data (i.e., "$LA^{50}$"), since the inventive material can be used as a surface covering. A positive result in this case, therefore, is indicated when the test product's $LA^{50}$ is greater than the $LA^{50}$ of a comparable wood sample. In this case, since a comparable wood sample having a thickness less than or equal to 10 mm has an $LA^{50}$ of 3,469, and since the $LA^{50}$ for the inventive material was 3,607, the inventive material is "not more toxic than wood."

With particular respect to flame spread and smoke density data, a tester subjected 1" thick sample panel materials in accordance with implementations of the present invention to ASTM E 84-03, "Standard Method of Test for Surface Burning Characteristics of Building Materials." This test is comparable to UL 723, ANSI/NFPA No. 255, and UBC No. 8-1.

In particular, the tester used sample materials in three pieces, twenty-four inches (24") wide by ninety-size inches (96") long, conforming to test chamber dimensions. These samples were supported during testing by two-inch (2") hexagonal mesh poultry netting, which ran the length of the test chamber. These samples were further supported by quarter-inch (¼") round metal rods, which were placed at two foot intervals across the width of the test chamber. The tester then placed the sample materials in the conditioning room (maintained at 73.4±5%), wherein sample materials reached moisture equilibrium.

The results of this test are detailed in Table 3 below, and summarized in Table 4 below. In Table 4, the summarized flame spread values are adjusted to the nearest figure divisible by 5, and the summarized smoke density values over 200 are rounded to the nearest figure divisible by 50.

TABLE 3

FLAME SPREAD

| | |
|---|---|
| Ignition: | 3 minutes, 4 seconds |
| Flame front: | 12 feet |
| Time to Maximum Spread: | 8 minutes, 12 seconds |
| Test Duration: | 8 minutes, 33 seconds |
| Calculation: | 40.19 × 0.515 = 20.70 |

TABLE 4

| SAMPLE IDENTIFICATION | FLAME SPREAD | SMOKE DENSITY |
| --- | --- | --- |
| Panels, 1" thick | 20 | 250 |

To obtain the "Flame Spread Classification," the above results were then compared to the following data of Table 5.

TABLE 5

| NFPA CLASS | UBC CLASS | FLAME SPREAD |
| --- | --- | --- |
| A | I | 0 through 25 |
| B | II | 26 through 75 |
| C | III | 76 through 200 |

Although flame spread of less than about 400 is considered acceptable in most applications, the sample products in accordance with implementations of the present invention qualify as an NFPA "Class A" material, and/or as a UBC "Class I" material. Accordingly, and in addition to providing superior aesthetic properties, laminate panels in accordance with the present invention can be used in a wide range of environments that require have stringent toxicity and flame spread standards.

The present invention may be embodied in other specific forms without departing from its spirit or essential characteristics. For example, panels made in accordance with the present invention can be formed to a wide variety of shapes and dimension, and scratches made to such resin encapsulated granite or wood layers can easily be buffed out. In addition, the structures and processes described herein can be deviated in any number of ways within the context of implementations of the present invention. For example, it is not required to use an adhesive layer in all cases, such as when manufacturing natural veneer resin sheets using an oven/vacuum/autoclave process. In particular, a manufacturer may find that an adhesive tie layer (such as EVA) may be more helpful primarily when using a standard high temperature fusion method to laminate, since the adhesive tie layer can enable bonding at much lower pressures and temperatures than typically used and are much more gentle to the natural or brittle decorative layer.

In additional or alternative implementations of the present invention, the laminate product can further include a composite reinforcement layer (i.e., "backer sheet," "backer layer," "matting," or "matting material"), which can be used to help keep particularly thin slices of the wood veneer from splitting or cracking during the assembly process. In one implementation, for example, the reinforcement/backer layer can be used against the wood veneer between any resin or glass sheets. Despite inclusion in the laminate assembly, the type and/or composition of reinforcement layer can be configured and/or chosen so as to avoid interfering with the intended aesthetic or light transmittance properties of the resulting laminate panel.

For example, the reinforcement layer can be chosen to be relatively thin, to avoid hindering light transmittance, and can further be chosen with certain composition properties to aid in this regard. In one implementation, for example, the reinforcement layer (or backing layer) comprises a cellulose (non-hazardous), synthetic polymer composite that is prepared as a paper-thin sheet layer. More specifically, such a reinforcement layer has a specific gravity ($H_2O=1$) of about 0.4-0.8, and further has a solubility in $H_2O$ of less than 0.1%.

The described embodiments are thus to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of manufacturing a laminate resin panel with sufficient structural properties for use as a building component in an architectural design environment, the resin panel having a thin or brittle veneer layer, such that the decorative resin panel is translucent, and such that the veneer layer is not substantially damaged during the laminating process, the method comprising:
    positioning an at least partially translucent veneer layer comprising a thin, veneer of naturally-occurring material reinforced by a backing layer about one or more at least partially translucent first resin layers having a thickness between about one-sixteenth ($\frac{1}{16}$) of an inch and about one-half ($\frac{1}{2}$) of an inch;
    wherein:
        the at least partially translucent veneer layer has a thickness of about one thirty-second ($\frac{1}{32}$) of an inch; and
        the backing layer comprises a different material than the thin, veneer of naturally-occurring material;
    positioning one or more at least partially translucent second resin layers having a thickness between about one-sixteenth ($\frac{1}{16}$) of an inch and about one-half ($\frac{1}{2}$) of an inch about the translucent veneer layer, such that at least the one or more first resin layers, the one or more second resin layers, and the at least partially translucent veneer layer form a laminate assembly with opposing viewable outer surfaces defined by the one or more first resin layers and the one or more second resin layers; and
    laminating the laminate assembly together with heat and pressure such that the one or more first resin layers adhere to the outer surface of the veneer of naturally-occurring material and the one or more second resin layers adhere to the outer surface of the translucent backing layer;
    wherein:
        the resulting combination is at least partially translucent; and
        the one or more first resin layers and the one or more second resin layers provide the laminate resin panel with sufficient structural properties for use as a building component in an architectural design environment.

2. The method as recited in claim 1, further comprising positioning one or more adhesive layers between the at least partially translucent veneer layer and each of the one or more first resin layers and the one or more second resin layers prior to laminating the laminate assembly.

3. The method as recited in claim 2, wherein laminating the laminate assembly comprises heating the laminate assembly to a temperature sufficient to cause the one or more adhesive layers to at least partially melt thereby adhering the at least partially translucent veneer layer to the one or more first resin layers and the one or more second resin layers.

4. The method as recited in claim 1, wherein laminating the laminate assembly comprises causing the one or more first resin layers and the one or more second resin layers to at least partially adhere to the at least partially translucent veneer layer upon subjection of the laminate assembly to temperatures less than about 300° F. and pressures less than about 100 psi.

5. The method as recited in claim 1, wherein laminating the laminate assembly comprises subjecting the laminate assembly to constant pressure.

6. The method as recited in claim 1, wherein laminating the laminate assembly comprises:
positioning the laminate assembly into a vacuum bag;
applying pressure by evacuating air from a vacuum bag;
placing the vacuum bag in one of an oven or autoclave; and
raising the temperature of the laminate assembly in the one of the oven or autoclave, such that the one or more first resin layers and the one or more second resin layers adhere to the at least partially translucent veneer layer.

7. The method as recited in claim 1, wherein laminating the laminate assembly comprises placing the laminate assembly in a press and raising the temperature of the laminate assembly to a level that causes the one or more first resin layers and the one or more second resin layers adhere to the at least partially translucent veneer layer.

8. The method as recited in claim 1, further comprising bending the resulting combination into one or more shapes.

9. The method as recited in claim 8, wherein the at least partially translucent veneer layer is not substantially cracked, crushed, or otherwise damaged.

10. The method as recited in claim 1, wherein the thin, naturally-occurring material comprises thinly sliced, natural wood.

11. The method as recited in claim 1, wherein the thin, naturally-occurring material comprises thin sheets of naturally-occurring stone, rock, or crystal.

12. The method as recited in claim 1, wherein the wherein the translucent backing layer comprises a synthetic polymer composite.

13. A method of manufacturing a decorative laminate resin panel having a thin or brittle veneer layer, such that the decorative laminate resin panel is translucent, and such that the veneer layer is not substantially damaged during the laminating process, the method comprising:
positioning an at least partially translucent veneer layer comprising a thin sheet of naturally-occurring wood and a translucent backing layer between a first resin layer and a second resin layer to form a laminate assembly;
wherein each of the first and second resin layers has a thickness between about one-sixteenth (1/16) of an inch and about one-half (1/2) of an inch,
the at least partially translucent veneer layer has a thickness of about one thirty-second (1/32) of an inch; and
the backing layer comprises a different material than the thin, veneer of naturally-occurring material;
positioning the laminate assembly within an autoclave or oven; and
laminating the laminate assembly together in the autoclave or oven with heat and pressure such that the first resin layer adheres to the thin sheet of naturally-occurring wood and the second resin layer adheres to the translucent backing layer and the resulting panel is at least partially translucent and the at least partially translucent veneer layer is substantially free of splits, cracks, and other deformations.

14. The method as recited in claim 13, wherein positioning an at least partially translucent veneer layer comprises positioning a plurality of sheets of naturally-occurring wood between a first resin layer and a second resin layer to form a laminate assembly.

15. The method as recited in claim 13, further comprising positioning one or more adhesive layers between the at least partially translucent veneer layer and each of the first resin layer and the second resin layer prior to fusing the laminate assembly.

16. The method as recited in claim 13, wherein laminating the laminate assembly comprises causing the first resin layer and the second resin layer to at least partially adhere to the at least partially translucent veneer layer upon subjection of the laminate assembly to temperatures less than about 300° F. and pressures less than about 100 psi.

17. The method as recited in claim 13, wherein laminating the laminate assembly comprises:
positioning the laminate assembly into a vacuum bag;
applying pressure by evacuating air from a vacuum bag;
placing the vacuum bag in one of an oven or autoclave; and
raising the temperature of the laminate assembly in the one of the oven or autoclave, such that the first resin layer and the second resin layer adhere to the at least partially translucent veneer layer.

18. The method as recited in claim 13, further comprising bending the resulting panel into one or more shapes.

19. The method as recited in claim 13, wherein the translucent backing layer comprises a synthetic polymer composite.

20. The method as recited in claim 19, wherein the translucent backing layer has a specific gravity of about 0.4-0.8.

* * * * *

UNITED STATES PATENT AND TRADEMARK OFFICE
CERTIFICATE OF CORRECTION

PATENT NO. : 8,512,505 B2  Page 1 of 1
APPLICATION NO. : 12/704003
DATED : August 20, 2013
INVENTOR(S) : Suare et al.

It is certified that error appears in the above-identified patent and that said Letters Patent is hereby corrected as shown below:

In the Specification

Column 1
Line 40, change ""PVC"; polyacrylate" to --"PVC", polyacrylate--
Line 42, change "acrylic); polyester" to --acrylic), polyester--
Line 46, change ""PCTG"; as well as" to --"PCTG", as well as--

Column 6
Line 6, change ""EVA"; ethylene" to --"EVA", ethylene--
Line 7, change ""EMA"; polyvinyl" to --"EMA", polyvinyl--
Line 7, change ""PVB"; or any" to --"PVB", or any--

Column 7
Line 15-16, change "removably-adhere" to --removably adhere--

Column 13
Line 26, change "have stringent" to --having stringent--
Line 32, change "dimension" to --dimensions--

In the Claims

Column 14
Line 17, change "thin, veneer" to --thin veneer--
Line 26, change "thin, veneer" to --thin veneer--

Column 16
Line 2, change "thin, veneer" to --thin veneer--

Signed and Sealed this
Twenty-sixth Day of November, 2013

Margaret A. Focarino
*Commissioner for Patents of the United States Patent and Trademark Office*